(12) United States Patent
Veach

(10) Patent No.: US 8,595,071 B2
(45) Date of Patent: Nov. 26, 2013

(54) USING ENHANCED AD FEATURES TO INCREASE COMPETITION IN ONLINE ADVERTISING

(75) Inventor: Eric Veach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1472 days.

(21) Appl. No.: 10/610,350

(22) Filed: Jun. 30, 2003

(65) Prior Publication Data
US 2004/0267612 A1    Dec. 30, 2004

(51) Int. Cl.
*G06Q 30/00*    (2012.01)
(52) U.S. Cl.
USPC ............. 705/14.73; 705/14.72; 705/14.3
(58) Field of Classification Search
USPC ................... 705/14.4, 14.72, 14.73
See application file for complete search history.

(56) References Cited

U.S. PATENT DOCUMENTS

| | | | |
|---|---|---|---|
| 5,666,215 A | 9/1997 | Fredlund et al. | |
| 5,724,521 A | 3/1998 | Dedrick | |
| 5,740,549 A | 4/1998 | Reilly et al. | |
| 5,819,092 A | 10/1998 | Ferguson et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,072,479 A * | 6/2000 | Ogawa | 707/104.1 |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,654,725 B1 | 11/2003 | Langheinrich et al. | |
| 6,961,710 B1 | 11/2005 | Yanagisawa et al. | |
| 6,985,882 B1 | 1/2006 | Del Sesto | |
| 7,039,599 B2 | 5/2006 | Merriman | |
| 7,136,875 B2 * | 11/2006 | Anderson et al. | 1/1 |
| 7,346,606 B2 * | 3/2008 | Bharat | 707/3 |
| 7,363,302 B2 * | 4/2008 | Lester | 707/7 |
| 2002/0077891 A1 * | 6/2002 | Castle et al. | 705/14 |
| 2003/0036944 A1 * | 2/2003 | Lesandrini et al. | 705/10 |
| 2003/0046161 A1 * | 3/2003 | Kamangar et al. | 705/14 |
| 2003/0105824 A1 * | 6/2003 | Brechner et al. | 709/206 |
| 2003/0110171 A1 * | 6/2003 | Ozer et al. | 707/10 |

(Continued)

FOREIGN PATENT DOCUMENTS

| | | |
|---|---|---|
| JP | 2000-148675 | 5/2000 |
| KR | 2002-0024478 | 3/2002 |
| KR | 2002-0074828 | 10/2002 |
| WO | WO 97/21183 | 6/1997 |

OTHER PUBLICATIONS

PCT International Search Report, for International Application No. PCT/US04/21006, form PCT/ISA/210, 4 pages.

(Continued)

*Primary Examiner* — Yehdega Retta
(74) *Attorney, Agent, or Firm* — Fish & Richardson P.C.

(57) ABSTRACT

In an online advertising system, advertisers compete with each other for advertising space. There may be multiple advertising positions available, where the placement of advertisements is determined by an auction. To encourage competition, some advertisements may be presented with enhanced features. These enhanced features create an incentive for which advertisers can compete, thereby increasing the effectiveness, usefulness and/or profitability of the advertising system. The application of enhanced features may be determined using at least one or more of pricing information, performance information and advertising information.

55 Claims, 3 Drawing Sheets

(56) References Cited

U.S. PATENT DOCUMENTS

| | | | |
|---|---|---|---|
| 2004/0073919 A1* | 4/2004 | Gutta et al. | 725/35 |
| 2004/0103024 A1* | 5/2004 | Patel et al. | 705/14 |
| 2004/0204983 A1* | 10/2004 | Shen et al. | 705/10 |
| 2011/0264508 A1 | 10/2011 | Harik | |

OTHER PUBLICATIONS

PCT Written Opinion of the International Searching Authority for International Application No. PCT/US04/21006, form PCT/ISA/237, 3 pages.
Reexamination of U.S. Appl. No. 95/001,073, filed Sep. 30, 2004 Stone et al.
Reexamination of U.S. Appl. No. 95/001,061, filed Sep. 3, 2002, Stone et al.
Reexamination of U.S. Appl. No. 95/001,069, filed Jul. 11, 2002, Dean et al.
Reexamination of U.S. Appl. No. 95/001,068, filed Dec. 7, 2002, Stone et al.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way To Buy And Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
"Person Who Controls Search Engines Controls Market (vol. 3)," Net Hanbai by Monthly published by Nippon Kobun Shuppan Co., Feb. 25, 2003, vol. 4, No. 3, pp. 24-30 (with partial translation).
Japanese Office Action in Application No. 2006-517796, dated Jul. 29, 2008 (with full translation).
Notification of the First Office Action CN 200480024369.0, dated Jan. 22, 2010, 14 pages.
Supplemental European Search Report (ESR) for Application No. EP 04 756 424.0-2221, dated Oct. 1, 2009, 3 pages.
Statement in accordance with the Notice from the European Patent Office dated Oct. 1, 2007 concerning business methods (OJ EPO Nov. 2007, 592-593) XP002456252,1 page.
Canadian Office for CN 2,530,367, dated Dec. 29, 2011, 6 pages.
Communication pursuant to Article 94(3) EPC dated Feb. 6, 2013, 6 pages.
Notice of Preliminary Rejection w/English Translation of the Preliminary Rejection dated Aug. 17, 2007 for KR Application No. 10-2005-7025454 11 pages.
Examination Report for CA Appl. No. 2,530,367 dated May 9, 2013, 5 pages.
Notification of the Second Office Action for CN 200480024369.0, dated Nov. 9, 2011, 6 pages (with English Translation).
JP Decision of Rejection (English Translation), in JP Patent Application No. 2009-157225, dated Sep. 11, 2012, 3 pages.
Summons to Attend Oral Proceedings Pursuant to Rule 115(1) EPC for EP 04756424.0-1958/1639431, dated Jul. 2, 2013, 8 pages.

* cited by examiner

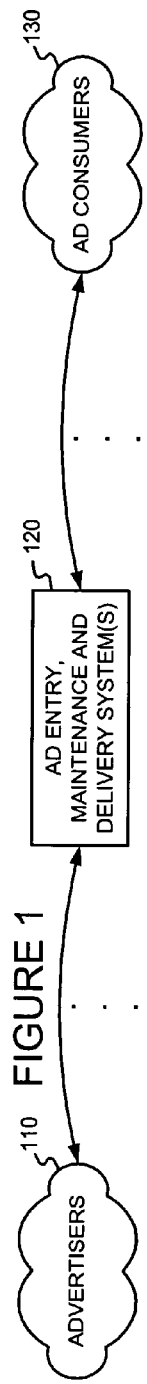
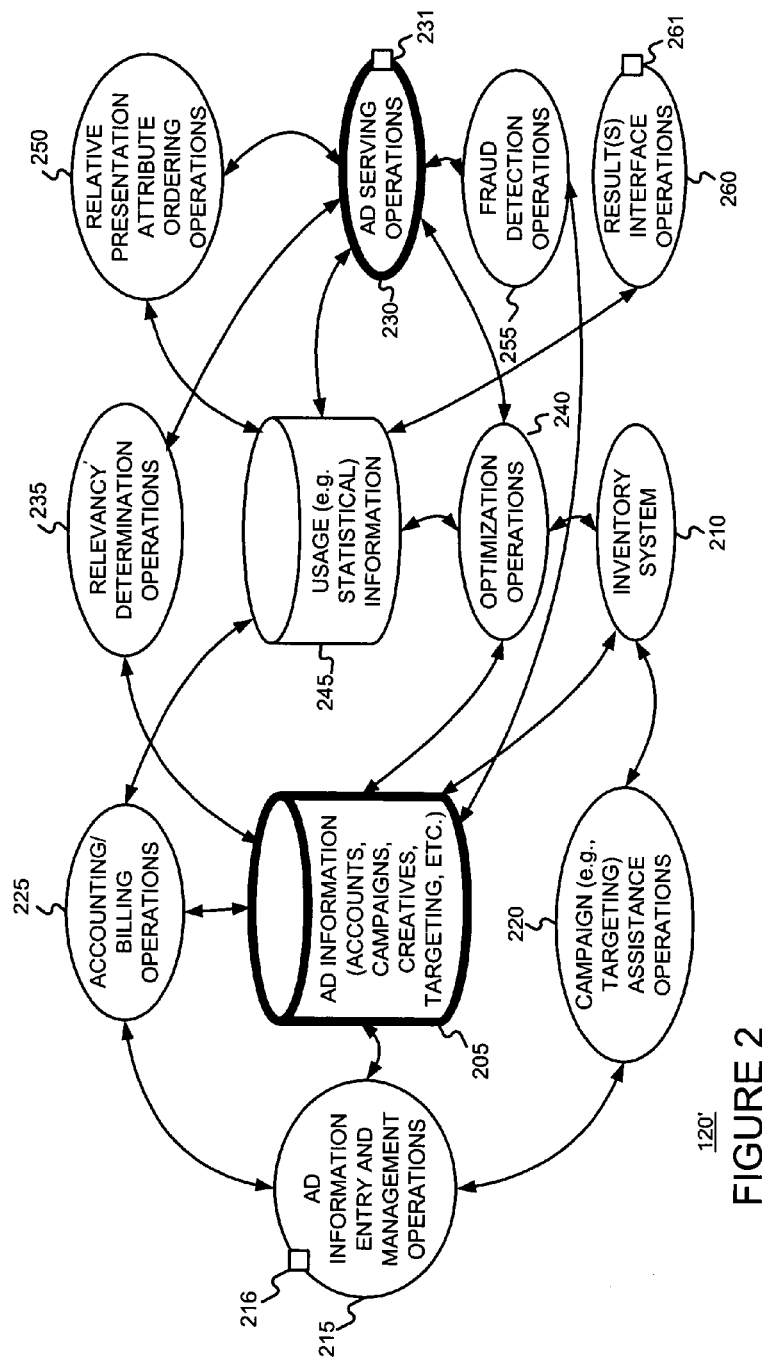

USING ENHANCED AD FEATURES TO INCREASE COMPETITION IN ONLINE ADVERTISING

§1. BACKGROUND OF THE INVENTION

§1.1 Field of the Invention

The present invention concerns advertising. In particular, the present invention concerns the way ads are to be presented to their audience and using enhanced presentation features to increase competition to produce better advertisements and markets.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are often presented to their advertising audience in the form of "banner ads" —i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed) is commonly referred to as the "click-through rate" of the ad. A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Web site, viewing at least a certain number of Web pages of a Website, spending at least a predetermined amount of time on a Website or Web page, etc. Often, if they don't indicate a consummated purchase, such user actions may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed) is commonly referred to as the conversion rate. If a conversion is defined to be able to occur within a predetermined time since the serving of an ad, one possible definition of the conversion rate might only consider ads that have been served more than the predetermined time in the past.

Despite the initial promise of Website-based advertisement, there remain several problems with existing approaches. Although advertisers are able to reach a large audience, they are frequently dissatisfied with the return on their advertisement investment.

Similarly, the hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com", which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

In some current auction-based online advertising systems, there can be multiple advertising positions on each Web page displayed. All ads typically have the same formatting, and are distinguished only by their position on the Web page. The positions near the top of the Web page are typically the most desirable, since ads with such placement tend to garner the attention of more end users. However, the difference in value, assumed by advertisers, between various ad positions might not be too great. Accordingly, although advertisers might prefer that their ads have a higher position, they may nonetheless be content if their ad appears in a lower position. If ad positioning is based, at least is part, on price, advertisers might be content to pay a lower price for a lower position. If placement is based, at least in part, on some performance measure of the ad, advertisers might be content if the performance of their ad isn't optimized. Thus, if advertisers don't perceive a sufficient advantage to higher placement positions, they might be content to pay less or to have ads with merely adequate performance. If the positioning is based, at least in part, on a performance parameter such as a conversion rate (e.g., a rate of consummated purchases at their Website for users that select their ad), the advertiser might not be terribly motivated to improve their Website or e-commerce user interface. If positioning is based, at least in part, on advertiser quality, the advertiser might not be terribly motivated to improve their e-commerce front end and back end, or their customer service.

As a result, end users may receive less focused and less relevant ads and possibly poorer e-commerce experiences. Moreover, advertisers may be hurt by their own complacency.

There remains, therefore, a need for more effective advertising using interactive media and services, including a need to serve ads in a manner that increases their relevance to audience members, and/or their economic value to an advertiser and/or to an ad system.

§2. SUMMARY OF THE INVENTION

The present invention provides a more-effective advertising system that applies enhanced features (which presumably enhance the performance of the ads), selectively, to ads to increase the (actual or perceived) performance differentiation of ads. Moreover, the policies under which enhanced features are applied to ads may be used to motivate advertisers to (i) improve their ads, (ii) improve their Websites, (iii) better focus their ad campaign, and/or (iv) increase their ad budget.

§3. BRIEF DESCRIPTION OF THE DRAWINGS

FIG. 1 is a high-level diagram showing parties or entities that can interact with an advertising system.

FIG. 2 is a bubble chart of an advertising environment in which the present invention may operate.

§4. DETAILED DESCRIPTION

Figure 4:
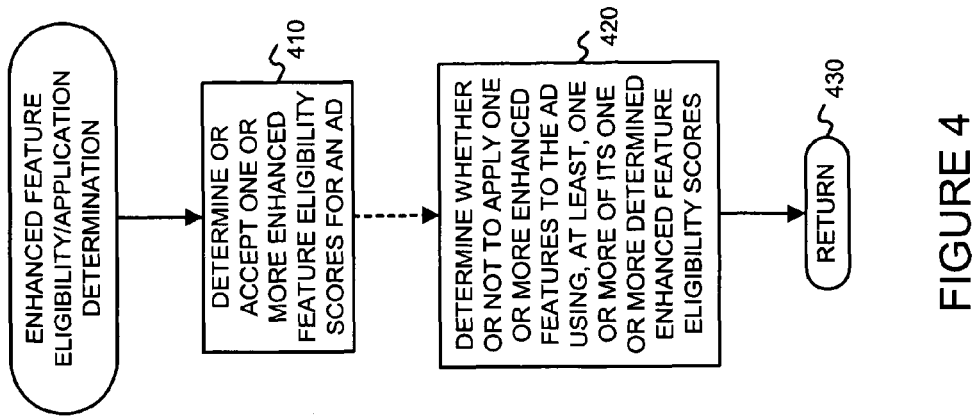
FIG. 4 is a flow diagram of an exemplary method that may be used to apply, selectively, one or more enhanced presentation features to one or more ads, in a manner consistent with the present invention.

The present invention involves novel methods, apparatus, message formats and/or data structures for selectively applying enhanced presentation features to online advertisements. It is believed that doing so will server to increase competition to produce better advertisements and markets. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, message formats and data structures and any other patentable subject matter.

In the following, environments in which the present invention may operate are described in §4.1. Then, exemplary embodiments of the present invention are described in §4.2. An example of operations of an exemplary embodiment of the present invention is then provided in §4.3. Finally, some conclusions regarding the present invention are set forth in §4.4.

§4.1 Environments in which the Present Invention may Operate

§4.1.1 Exemplary Advertising Environment

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, meta information, and/or machine executable instructions. Ad consumers 130 may submit requests for ads to, accept ads responsive to their request from, and provide usage information to, the system 120. Although not shown, other entities may provide usage information (e.g., whether or not a conversion or click-through related to the ad occurred) to the system 120. This usage information may include measured or observed user behavior related to ads that have been served.

One example of an ad consumer 130 is a general content server that receives requests for content (e.g., articles, discussion threads, music, video, graphics, search results, web page listings, etc.), and retrieves the requested content in response to, or otherwise services, the request. The content server may submit a request for ads to the system 120. Such an ad request may include a number and/or type of ads desired. The ad request may also include content request information. This information may include the content itself (e.g., a document such as a Web page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the end user that requested the content, for presentation to the viewer. Finally, the content server may transmit information about the ads and how, when, and/or where the ads are to be rendered (e.g., position, click-through or not, impression time, impression date, size, conversion or not, etc.) back to the system 120. Alternatively, or in addition, such information may be provided back to the system 120 by some other means.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Preferably, the search results are maintained as distinct from the ads, so as not to confuse the user between paid advertisements and presumably neutral search results.

The search engine may transmit information about the ad and when, where, and/or how the ad was to be rendered (e.g., position, click-through or not, impression time, impression date, size, conversion or not, etc.) back to the system 120. Alternatively, or in addition, such information may be provided back to the system 120 by some other means.

Yet another example of an ad consumer 130 is an e-mail server. The e-mail server may submit a request for ads to the system 120. The request may include a number of ads desired. The request for ads may also include e-mail information. Such information may include, for example, body text from the e-mail, a sender, a recipient, a subject line, information related to, associated with, or derived from the e-mail, etc.

The e-mail server may combine the e-mail with one or more of the advertisements provided by the system 120. This combined information including the e-mail and advertisement(s) may then be presentation to a user, such as a recipient or a sender. Finally, the e-mail server may transmit information about the ad and how the ad was to be rendered (e.g., position, click-through or not, impression time, impression date, size, etc.) back to the system 120.

§4.1.2 Exemplary Ad Entry, Maintenance and Delivery Environment

FIG. 2 illustrates an exemplary ad system 120' in which, or with which, the present invention may be used. The exemplary ad system 120' may include an inventory system 210 and may store ad information 205 and usage information 245. The exemplary system 120' may support ad information entry and management operations 215, campaign (e.g., targeting) assistance operations 220, accounting and billing operations 225, ad serving operations 230, relevancy determination operations 235, optimization operations 240, relative presentation attribute assignment (e.g., position ordering) operations 250, fraud detection operations 255, and result interface operations 260.

Advertisers 110 may interface with the system 120' via the ad information entry and management operations 215 as indicated by interface 216. Ad consumers 130 may interface with the system 120' via the ad serving operations 230 as indicated by interface 231. Ad consumers 130 and/or other entities (not shown) may also interface with the system 120' via results interface operations 260 as indicated by interface 261.

An advertising program may include information concerning accounts, campaigns, creatives, targeting, etc. The term "account" relates to information for a given advertiser (e.g., a unique email address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include a set of keywords, and a maximum cost bid (cost per click-though, cost per conversion, etc.). Alternatively, or in addition, each ad group may include an average cost bid (e.g., average cost per click-through, average cost per conversion, etc.). Therefore, a single maximum cost bid and/or a single average cost bid may be associated with one or more keywords. As stated, each ad group may have one or more ads or "creatives" (That is, ad content that is ultimately rendered to an end user.). Naturally, the ad information 205 may include more or less information, and may be organized in a number of different ways.

The ad information 205 can be entered and managed via the ad information entry and management operations 215. Campaign (e.g., targeting) assistance operations 220 can be employed to help advertisers 110 generate effective ad campaigns. For example, the campaign assistance operations 220 can use information provided by the inventory system 210, which, in the context of advertising for use with a search engine, may track all possible ad impressions, ad impressions already reserved, and ad impressions available for given keywords. The ad serving operations 230 may service requests for ads from ad consumers 130. The ad serving operations 230 may use relevancy determination operations 235 to determine candidate ads for a given request. The ad serving operations 230 may then use optimization operations 240 to select a final set of one or more of the candidate ads. Finally, the ad serving operations 230 may use relative presentation attribute (e.g., position) assignment operations 250 to order the presentation of the ads to be returned. The fraud detection operations 255 can be used to reduce fraudulent use of the advertising system (e.g., by advertisers), such as through the use of stolen credit cards. Finally, the results interface operations 260 may be used to accept result information (from the ad consumers 130 or some other entity) about an ad actually served, such as whether or not click-through occurred, whether or not conversion occurred (e.g., whether the sale of an advertised item or service was initiated or consummated within a predetermined time from the rendering of the ad), etc. Such results information may be accepted at interface 261 and may include information to identify the ad and time the ad was served, as well as the associated result.

Various embodiments of the system 120 may perform operations such as these described in one or more of the following:

(i) U.S. patent application Ser. No. 10/261,294 (incorporated herein by reference), entitled "ACCENTUATING TERMS OR FEATURES OF INTEREST IN AN ADVERTISEMENT", filed on Sep. 30, 2002 and listing Nina Marie Kim as the inventor;

(ii) U.S. Provisional Application Ser. No. 60/439,354 (incorporated herein by reference), entitled "METHOD AND APPARATUS FOR ESTIMATING ELECTRONIC ADVERTISING INVENTORY", filed on Jan. 10, 2003 and listing Magnus Sandburg, Eric Veach, John A. Bauer and Zhe Qian as the inventors;

(iii) U.S. Provisional Application Ser. No. 60/449,483 (incorporated herein by reference), entitled "AUTOMATICALLY GENERATING ADVERTISING CREATIVES", filed on Feb. 24, 2003 and listing Craig Nevill-Manning, Christopher Rohrs, Thorsten Brants, Steve Lawrence and Ross Koningstein as inventors;

(iv) U.S. patent application Ser. No. 10/314,427 (incorporated herein by reference), entitled "METHODS AND APPARATUS FOR SERVING RELEVANT ADVERTISEMENTS", filed on Dec. 6, 2002 and listing Jeffrey Dean, Georges Harik and Paul Bucheit as inventors;

(v) U.S. patent application Ser. No. 10/375,900 (incorporated herein by reference), entitled "SERVING ADVERTISEMENTS BASED ON CONTENT", filed on Feb. 26, 2003 and listing Darrell Anderson, Paul Bucheit, Alex Carobus, Claire Cui, Jeffrey Dean, Georges Harik, Deepak Jindal, and Narayanan Shivakumar as inventors;

(vi) U.S. Provisional Application Ser. No. 60/317,847 (incorporated herein by reference), entitled "METHODS AND APPARATUS FOR ORDERING ADVERTISEMENTS", filed on Sep. 6, 2001 and listing Jane Manning, Salar Kamangar and Eric Veach as inventors;

(vii) U.S. patent application Ser. No. 10/112,656 (incorporated herein by reference), entitled "METHODS AND APPARATUS FOR ORDERING ADVERTISEMENTS BASED ON PERFORMANCE INFORMATION", filed on Mar. 29, 2002 and listing Jane Manning, Salar Kamangar, Eric Veach and Lawrence Page as inventors; and/or (viii) U.S. patent application Ser. No. 10/112,654 (incorporated herein by reference), entitled "METHODS AND APPARATUS FOR ORDERING ADVERTISEMENTS BASED ON PERFORMANCE INFORMATION AND PRICE INFORMATION", filed on Mar. 29, 2002 and listing Salar Kamangar, Ross Koningstein and Eric Veach as inventors.

(ix) U.S. Provisional Application Ser. No. 60/424,792 (incorporated herein by reference), entitled "AUTOMATED PRICE MAINTENANCE FOR USE WITH A SYSTEM IN WHICH ADVERTISEMENTS ARE RENDERED WITH RELATIVE PREFERENCE BASED ON PERFORMANCE INFORMATION AND PRICE INFORMATION", filed on Nov. 8, 2002 and listing Eric Veach as the inventor;

(x) U.S. patent application Ser. No. 10/340,543 (incorporated herein by reference), entitled "AUTOMATED PRICE MAINTENANCE FOR USE WITH A SYSTEM IN WHICH ADVERTISEMENTS ARE RENDERED WITH RELATIVE PREFERENCES", filed on Jan. 10, 2003 and listing Eric Veach and Salar Kamangar as inventors;

(xi) U.S. patent application Ser. No. 10/419,692 (incorporated herein by reference), entitled "Determining Contextual Information for Advertisements and Using Such Determined Contextual Information to Suggest Targeting Criteria and/or In The Serving of Advertisements", filed on Apr. 21, 2003, and listing Amit Singhal, Mehran Sahami, Amit Patel, and Steve Lawrence as inventors; and (xii) U.S. patent application Ser. No. 10/445,376 (incorporated herein by reference), entitled "SCORING, MODIFYING SCORES OF, AND/OR FILTERING ADVERTISEMENTS USING ADVERTISER INFORMATION", filed on May 23, 2003, and listing Jane Manning, Salar Arta Kamangar and Eric Veach as inventors.

§4.1.3 Definitions

Online ads, such as those used in the exemplary systems described above with reference to FIGS. 1 and 2, or any other system, may have various features. Such features may be specified by an application and/or an advertiser. These features are referred to as "ad features" below. For example, in the case of a text ad, ad features may include a title line, ad text, executable code, an embedded link, etc. In the case of an image ad, ad features may additionally include images, etc. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad is served (including one or more topics or concepts determined to be associated with the page, information or content located on or within the page, information about the page such as the host of the page (e.g. AOL, Yahoo, etc.), the importance of the page as measured by e.g. traffic, freshness, quantity and quality of links to or from the page etc., the location of the page within a directory structure, etc.), a search query or search results associated with the serving of the ad, a user characteristic (e.g., their geographic location, the language they use, the type of browser used, previous page views, previous behavior), a host or affiliate site (e.g., America Online, Google, Yahoo) that initiated the request that the ad is served in response to, an absolute position of the ad on the page on which it is served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as conditions or constraints. When used as serving conditions or constraints, such serving parameters are referred to simply as "serving constraints". For example, in some systems, an advertiser may be able to specify that its ad is only to be served on weekdays, no lower than a certain position, only to users in a certain location, etc. As another example, in some systems, an advertiser may specify that its ad is to be served only if a page or search query includes certain keywords or phrases.

"Ad information" may include any combination of ad features, ad serving constraints, information derivable from ad features or ad serving constraints (referred to as "ad derived information"), and/or information related to the ad (referred to as "ad related information"), as well as an extensions of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Other examples of documents include animations, movies, interactive videoconferences, phone calls, radio, etc. Parts of a document to be rendered to an end user can be thought of as "content" of the document. A document may include "structured data" containing both content (e.g., words, pictures, etc.) and some indication of the meaning of that content (e.g., e-mail fields and associated data, HTML tags and associated data, etc.). Ad spots in the document may be defined by embedded information or instructions. In the context of the Internet, a common document is a Web page. Another common document is a search result page. Yet another common document is an e-mail. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

A document may include one or more "available ad spots". Such available ad spots may be predetermined and be an inherent part of the document, may be subject to change, and/or may be determined as the document is being served. An ad consumer 130 may request ads from an ad server 120 to fill some or all of such available ad spots. An ad spot may be able to accommodate different type of ads, but may specify a certain type of ad.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

Various exemplary embodiments of the present invention are now described in §4.2.

§4.2 Exemplary Embodiments

Figure 3:
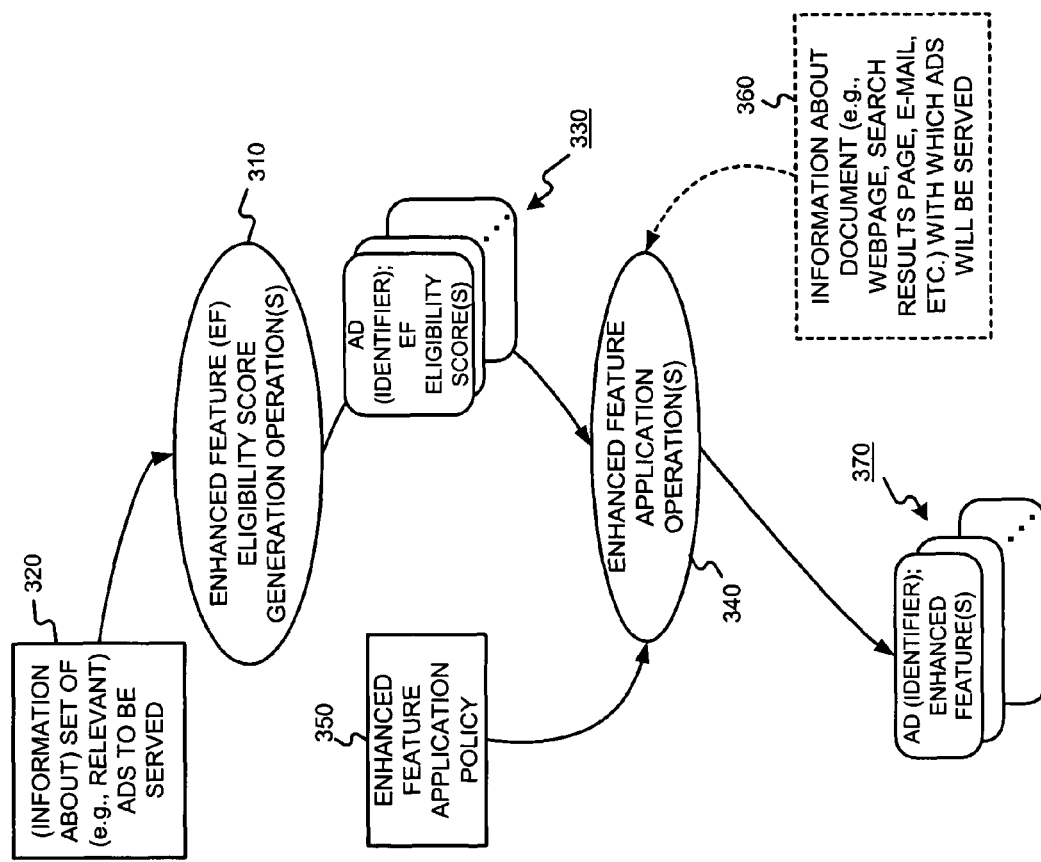
FIG. 3 is a bubble chart illustrating operations that may be performed in a manner consistent with the present invention.

FIG. 3 is a bubble chart illustrating operations that may be performed in a manner consistent with the present invention. Enhanced feature ("EF") eligibility score generation operations 310 may be used to generate one or more enhanced feature eligibility scores 330 for each of one or more ads based on information 320 about the ads. Enhanced feature application operations 340 may accept one or more ads (or ad identifiers), each having one or more enhanced feature eligibility scores 330, and may determine whether or not to apply various enhanced features to each of the ads based on their scores using an enhanced feature application policy 350. It 340 may also use information 360 about a document with which the ads will be served in its determination.

Possible enhanced presentation features for ads may include one or more of the following: (i) larger ad size; (ii) louder ad volume; (iii) brighter or more vivid ad display; (iv) larger ad font size; (v) emphasizing font types (unique font styles, bolding, italics, underlining, flashing text, marque text, etc.); (vi) more content (e.g., longer temporally, more text, etc.); (vii) enhanced color schemes; (viii) animation (within ad and/or within document); (ix) video; (x) sound; (xi) sound effects; (xii) persisting, or lasting longer; (xiii) occlusion (e.g., pop-up window) of document or of document content; (xiv) special border effects (e.g., chasers, flashing borders, etc.), (xv) location; (xvi) outline shape; (xvii) programmed user interactivity, etc. Other enhanced features are possible. Generally, enhanced features improve the performance of an ad.

§4.2.1 Exemplary Method for Selectively Applying Enhanced Features

FIG. 4 is a flow diagram of an exemplary method 400 that may be used to determine whether or not to apply one or more enhanced features to an ad, in a manner consistent with the present invention. One or more enhanced feature eligibility scores for the ad is determined (or accepted if already determined). (Block 410) Then, it is determined whether or not to apply one or more enhanced features using, at least, one or more of the determined enhanced feature eligibility score(s) (Block 420) before the method 400 is left (Node 430).

§4.2.2 Exemplary Ad Information

Figure 5:
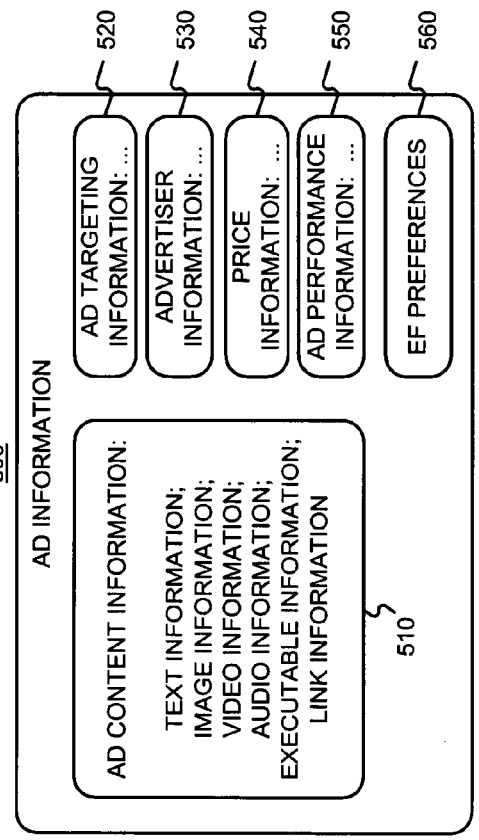
FIG. 5 illustrates exemplary ad information that may be associated with an ad.

FIG. 5 illustrates exemplary ad information 500 that may be associated with an ad. As shown, the ad information may include ad content information (e.g., one or more of text information, image information, video information, audio information, executable information, link information, etc.) 510, ad targeting (i.e., ad serving constraints such as keywords, geolocation, etc., for example) information 520, advertiser information 530, price information 540, ad performance information 550, and/or enhanced feature preferences 560. Such information 520, 530, 540, 550 and/or 560 may be associated with an ad, but alternatively may be associated with some set of ads such as an ad group, or an ad campaign for example.

In accordance with one embodiment of the present invention, the ad information 500 includes enhanced feature preferences 560. For example, instead of relying on some measure of the value of one or more enhanced features, particularly a general measure of value, an advertiser may have its own views as to the values of enhanced features and may therefore want to specify which enhanced feature or features it prefers to have applied to its ad. For example, suppose ads with flashing text in bold on a brightly colored background with a chaser-light border generally perform better than those with static text, with a more somber background color and with a thin, black-line border. Nonetheless, certain businesses, such as a funeral home or a custom suit tailor specializing in conservative business suits for example, might well prefer more restrained ads in keeping with a more conservative image. Enhanced feature preferences allow an advertiser to customize the application of such features as they see fit. (Note, however, that a stated preference with regard to one or more enhanced features does not guarantee that the ad will be entitled to be rendered with such enhanced features.)

§4.2.3 Exemplary Document Information

Figure 6:
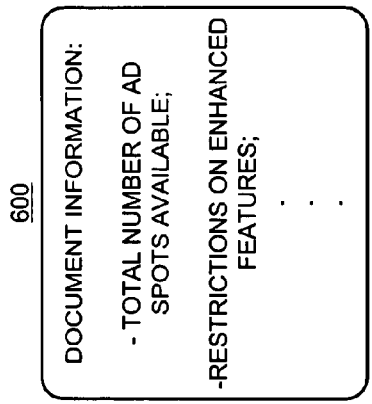
FIG. 6 illustrates exemplary document information that may be associated with a document with which one or more ads are to be served.

FIG. 6 illustrates exemplary document information 600 that may be associated with a document with which one or more ads are to be served. The document information may include, among other things, a total number of ad spots available, restrictions, if any, on enhanced features to be applied to ads served with the document, etc.

§4.2.4 Exemplary Techniques for Determining Enhanced Feature Eligibility Score(s)

Referring back to block 410 of FIG. 4, for a given ad, the enhanced feature eligibility score(s) may be determined using, perhaps among other things, (i) price information associated with the ad, (ii) performance information associated with the ad, and/or (iii) quality information about an advertiser associated with the ad. Such information may be generally considered to be ad information. (Recall, e.g., FIG. 5.)

By way of example, the price information may be based on one or more of the following: (a) an amount that an advertiser has agreed to pay each time the ad is rendered; (b) a maximum amount that an advertiser has expressed that it is willing to pay each time the ad is rendered; (c) an amount that an advertiser has agreed to pay each time the ad is rendered and selected; (d) a maximum amount that an advertiser has expressed that it is willing to pay each time the ad is rendered and selected; (e) an average over time of the amount that the advertiser has agreed to pay each time the ad is rendered and selected; (f) an average over time of the maximum amount that the advertiser has expressed that it is willing to pay each time the ad is rendered and selected; (g) an amount that the advertiser has agreed to pay each time the ad is rendered and a conversion, associated with the ad, occurs; (h) a maximum amount that the advertiser has expressed that it is willing to pay each time the ad is rendered and a conversion, associated with the ad, occurs; (i) cost per selection information; (j) cost per conversion information; (k) an average of cost per selection information over a period of time; (l) an average cost per conversion information over time; etc.

The performance information may be a measure of user interest in the associated advertisement. For example, performance information may be a function of one or more of the following: (a) a click-through rate of the associated advertisement, (b) user ratings of the advertisement, (c) focus group ratings of the advertisement, (d) a measure of user interest for the advertisement weighted for a size (or some other enhanced feature) of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, (i) a conversion rate associated with the advertisement, etc. The performance information may include estimates of user interest in the associated advertisement.

The advertiser information may include advertiser quality information. Advertiser quality information may include one or more of the following: (a) charge-back information (e.g. from credit cards); (b) a quality metric of the advertiser (e.g., PageRank™ of the advertiser's home or main Website according to the methods described in U.S. Pat. No. 6,285,999 issued to Page, the advertiser's length of operation or continuous operation, duration of registration of Web page or domain, user dwell time or stay time after selection, etc.); (c) conversion information; (d) customer ratings of the advertiser (e.g., epinions ratings, bizrate ratings, etc.) or third party ratings of the advertiser; (e) a user rating/feedback system such as, for example, the system operated by eBay Inc., (including systems whereby users are allowed to rate or submit feedback on an advertisers directly or indirectly, without necessarily having consummated a transaction); (f) complaints logged against the advertiser (e.g., Better Business Bureau, or based on internal or external customer support/call center calls, etc.); (g) repeat visit information; (h) repeat purchase information; (i) abnormally high price information (which may indicate a fraudulent lack of intent to pay); and (j) abnormally high advertising budget (which may indicate a fraudulent lack of intent to pay).

Various ways of determining a score, which may be used as an enhanced feature eligibility score in a manner consistent with the present invention, are described in U.S. patent application Ser. No. 10/112,656, entitled "METHODS AND APPARATUS FOR ORDERING ADVERTISEMENTS BASED ON PERFORMANCE INFORMATION", filed on Mar. 29, 2002 and listing Jane Manning, Salar Arta Kamangar, Eric Veach and Lawrence E. Page as the inventors, and U.S. patent application Ser. No. 10/112,654, entitled "METHODS AND APPARATUS FOR ORDERING ADVERTISEMENTS BASED ON PERFORMANCE INFORMATION AND PRICE INFORMATION", filed on Mar. 29, 2002 and listing Salar Arta Kamangar, Ross Koningstein and Eric Veach as the inventors, and U.S. patent application Ser. No. 10/445,376, entitled "SCORING, MODIFYING SCORES OF, AND/OR FILTERING ADVERTISEMENTS USING ADVERTISER INFORMATION," filed on May 23, 2003 and listing Jane Manning, Salar Kamangar, and Eric Veach as the inventors. Each of these applications is incorporated herein by reference.

The score may also reflect some measure of the relevance (e.g., an IR score) of the ad.

In one embodiment of the present invention, a single enhanced feature eligibility score is determined for a given ad. In another embodiment of the present invention, more than one enhanced feature eligibility score are determined for each ad. For example, an ad may have an enhanced feature eligibility score determined for (i) each enhanced feature permitted on a document, (ii) each enhanced feature desired by the advertiser, (iii) each enhanced feature that is both permitted on a document and desired by the advertiser, (iv) a type of enhanced features, and/or (v) a grouping of enhanced features, etc.

§4.2.5 Exemplary Techniques for Determining whether or not to Apply One or More Enhanced Features to an ad Using, at Least, its One or More Enhanced Feature Eligibility Scores Referring back to block 420 of FIG. 4, for a given ad, it is determined whether or not to apply one or more enhanced features to the ad using, at least, one or more determined enhanced feature eligibility scores. One or more rules, such as thresholds, may be applied.

This determination may also be a function of document restrictions, advertiser preferences, and/or other scores of competing ads, etc. Thus, whether or not to apply enhanced features to an ad may be performed in multiple stages. For example, it may first be determined whether or not the ad is "eligible" to be presented with enhanced features (e.g., using at least the eligibility score(s) of the ad). Then it can be determined whether or not the enhanced features will, in fact, be applied to the ad (e.g., based on enhanced feature eligibility score(s) of other ads, document restrictions, and/or policies, etc.).

In one embodiment of the invention, a single enhanced feature eligibility score is determined for a given ad. Whether or not to apply one or more enhanced features, or one or more enhanced feature groupings, may be determined based on this score. In one embodiment, this score may be decreased as the enhanced features are applied to the ad.

In another embodiment of the invention, different enhanced feature eligibility scores are determined for a given ad. Whether or not to apply one or more enhanced features, or one or more enhanced feature groupings be determined using different ones of these scores.

§4.2.6 Exemplary Apparatus

Figure 7:
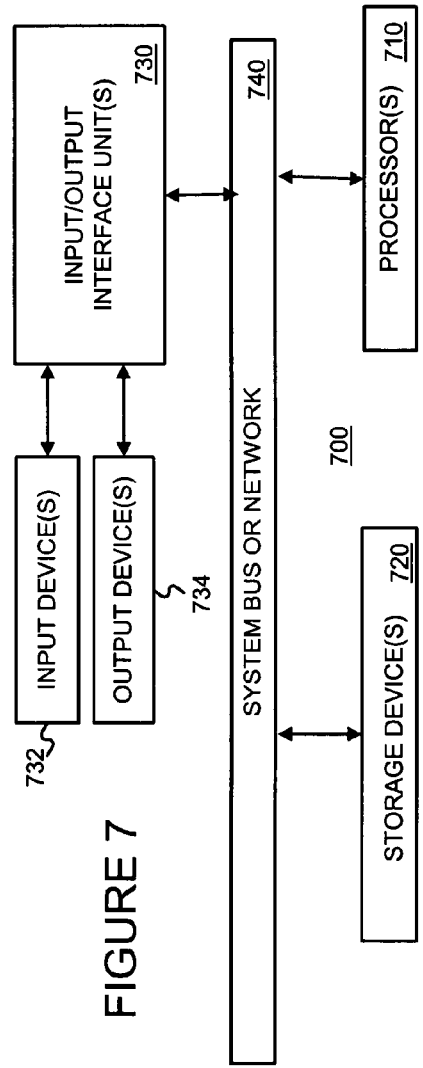
FIG. 7 is a high-level block diagram of apparatus that may be used to effect at least some of the various operations that may be performed, and store various information that may be used and/or generated in a manner consistent with the present invention.

FIG. 7 is high-level block diagram of a machine 700 that may perform one or more of the operations discussed above. The machine 700 basically includes a processor(s) 710, an input/output interface unit(s) 730, a storage device(s) 720, and a system bus or network 740 for facilitating the communication of information among the coupled elements. An input device(s) 732 and an output device(s) 734 may be coupled with the input/output interface(s) 730.

The processor(s) 710 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 720 and/or may be received from an external source via an input interface unit 730.

In one embodiment, the machine 700 may be one or more conventional personal computers. In this case, the processing unit(s) 710 may be one or more microprocessors. The bus 740 may include a system bus. The storage devices 720 may include system memory, such as read only memory (ROM) and/or random access memory (RAM). The storage device(s) 720 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 732, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 710 through an appropriate interface 730 coupled to the system bus 740. However, in the context of the present invention, no input devices, other than those needed to accept ad information, policy information, and document information, and possibly those for system administration and maintenance, are needed.

The output device(s) 734 may include a monitor or other type of display device, which may also be connected to the system bus 740 via an appropriate interface. In addition to (or instead of) the monitor, the personal computer may include other (peripheral) output devices (not shown), such as speakers and printers for example. Again, in the context of presentation ordering operation(s), no output devices, other than those needed to communicate ads and any enhanced features to be applied to such ads, and possibly those for system administration and maintenance, are needed.

§4.2.7 Alternatives and Refinements

§4.2.7.1 Normalizing Performance Information to Remove Influence of Enhanced Features Since the performance of an ad may be (and indeed is expected to be) influenced by the application of enhanced features, if a later determination of whether to apply one or more enhanced features is determined using, in some way, such past performance of the ad, it may be desirable to remove the influence that the prior application of enhanced features had on the ad's performance.

For example, consider a document in which two ads, ad A and ad B, are to be served. Assume that only one of the ads will be permitted to be rendered with bold text and a color background (e.g., due to a document restriction or some policy). Suppose further that ad A has been rendered in the past in with bold text and a color background, and has a click-through rate of 0.30, and that ad B has been rendered in the past with a normal text and a white background, and has a click-through rate of 0.27. Finally, suppose that the determination of whether or not to apply the enhanced features of bold type and color background will be based solely on click-through rate of the ad. Although ad A may have a better click-through rate than ad B, some of its performance may very well be attributable to the fact that it was rendered in bold text with a color background in the past, while ad B was not. It may turn out that if the performance of ad A were normalized to remove the influence of these enhanced features, it would only have an expected click-through rate of 0.23.

Accordingly, in this example, ad B might "win" the right to be rendered with bold typeface and with a color background, even though ad A has had better actual performance.

§4.2.7.2 Considering Advertiser Preferences with Respect to Different Enhanced Features As mentioned above, an advertiser might value certain enhanced features more than others, and might even want to avoid the application of certain enhanced features to its ad or ads. Referring back to FIG. 5, the enhanced feature preference information 560 may reflect or encode these preferences in some way. For example, an advertiser might rank-order desired enhanced features and/or enhanced feature groupings (e.g., style templates). Alternatively, or in addition, an advertiser might expressly exclude certain enhanced features. Alternatively, or in addition, certain enhanced features might be implicitly excluded. For example, if the ad content information 510 does not include any video information, it will not include video as an enhanced feature, even if it is otherwise eligible for it.

An example of such preference information is provided below:

| | | |
|---|---|---|
| Grouping 1 (larger ad/more text) | rank = 1 | exclude? = no |
| Grouping 2 (vivid color scheme and audio effects) | rank = ___ | exclude? = yes |
| Grouping 3 (traditional color scheme and italics) | rank = ___ | exclude? = no |
| Grouping 4 (video and audio) | rank = ___ | exclude? = yes |
| Larger ad size | rank = 2 | exclude? = no |
| Larger font size | rank = 4 | exclude? = no |
| Bold font type | rank = 5 | exclude? = no |
| More text | rank = 3 | exclude? = no |
| Color schemes (vivid) | rank = ___ | exclude? = yes |
| Color schemes (traditional) | rank = 7 | exclude? = no |
| Animation | rank = ___ | exclude? = yes |
| Video | rank = ___ | exclude? = yes |
| Sound | rank = ___ | exclude? = yes |
| Persistence | rank = 6 | exclude? = no |
| Pop up | rank = ___ | exclude? = no |
| Pop under | rank = ___ | exclude? = no |

In this example, the advertiser prefers that the enhanced feature "grouping 1" be applied to its ad, then larger ad size, then more text, then larger font size, then bold font type, then persistence, and then traditional color scheme. The advertiser would allow certain enhanced features, such as "grouping 3", pop up and pop under, to be applied to its ad, but expressed no preference with respect to these features. Finally, the advertiser would preclude enhanced features "grouping 2", "grouping 4", vivid color scheme, animation, video and sound from being applied to its ad or ads.

§4.2.7.3 Permitting Content Provider Control

In one embodiment of the invention, the content provider can exclude ads from being rendered with certain enhanced features on its document. For example, a content provider might exclude pop up advertisements, or advertisements with sound.

§4.2.7.4 Using Ad Features to Signal Ad Usefulness

In one embodiment of the invention, feature changes, such as applying enhanced features (or even applying degrading features) for example, may also be used to indicate to the user the general quality of the advertisements. For example, if the predicted performance of most of the ads on a page is poor, then all ads may be rendered in a smaller size, less noticeable colors, or in a different region of the display page (such as the bottom). This provides an incentive for advertisers to improve the targeting and relevance of their advertisements, and it provides users with an (e.g., visual) indicator of the usefulness of the ads.

§4.2.7.5 Enhanced Ad Features with Respect to a Set of Expected ad Serves

Although some of the foregoing embodiments focus on ads competing for a given page view, the principles of the present invention could be applied to ads that compete, ahead of time, on an aggregation of expected page views. In such an embodiment, enhanced features could include "primetime" serving, "prime location" serving, etc. For example, ads shown between 10 AM and 2 PM might generally perform better than those shown between 3 AM and 6 AM local time. In this case, serving an ad for rendering at a "primetime" could be thought of as an enhanced feature. In another example, ad served to a specific local might perform those served to another local. In this case, serving an ad for rendering at a "prime location" could be thought of as an enhanced feature.

§4.2.7.6 Use with Ads Provided as "Search Results"

The present invention can be applied to many types of ads, including ads purporting to be search results. In this case, enhanced features may be applied to purported search results (or any search results where a sponsor pays for inclusion) in a manner consistent with the present invention.

§4.3 Exemplary Operations in an Exemplary Embodiment

In the following example, suppose three ads, A, B, and C are to be served with a document. Suppose further that ad A has the following preferences:

| Larger ad size | rank = 1 | exclude? = no |
| Larger font size | rank = ___ | exclude? = no |
| Bold font type | rank = ___ | exclude? = no |
| More text | rank = 2 | exclude? = no |
| Color schemes (vivid) | rank = ___ | exclude? = yes |
| Color schemes (traditional) | rank = 3 | exclude? = no; | ad B has the following preferences:

| Larger ad size | rank = 2 | exclude? = no |
| Larger font size | rank = ___ | exclude? = no |
| Bold font type | rank = ___ | exclude? = no |
| More text | rank = ___ | exclude? = no |
| Color schemes (vivid) | rank = 1 | exclude? = no |
| Color schemes (traditional) | rank = ___ | exclude? = yes; | and ad C has no preferences. Suppose further that the ad A has a feature eligibility score of 100, ad B has a feature eligibility score of 150 and ad C has a feature eligibility score of 75. Suppose that the following policy thresholds are used to determine whether enhanced features may be applied (i.e., whether the ad is eligible for such enhanced features):

| Bold font type | score > 100 |
| Color schemes (vivid) | score > 50 |
| Color schemes (traditional) | score > 50 |
| More text | score > 200 AND remaining score 100 |
| Larger ad size | remaining score > 75 |
| Larger font size | remaining score > 75 |

In one embodiment of the present invention, these features may be tested in the order shown (unless the advertiser has a different rank order). Suppose that such scores are decreased by 60 as ad features are added. Finally, suppose that the document restrictions include (i) excluding the vivid color scheme, and (ii) limiting the number of larger ads to one.

In this example, ad B would be rendered with a larger ad size (since its score was higher than that of ad A and its remaining score (150) is >75), with a larger font size (since its remaining score (150–60)>75), and with bold font type (since its score>100). However, ad B would not have more text (since its score <200 and since its remaining score (150–60–60)<100). Although ad B would be eligible to have a vivid color scheme (since its score>50), it would not have such a vivid color scheme applied due to a document restriction. Although ad A would be eligible to have a larger font size, since ad B already has this feature and a document restriction limits the number of larger ads to one, ad A would not have a larger ad size enhanced feature applied. Ad A would be rendered with a traditional color scheme (since its score>50). Ad C would be rendered with a larger font size (since its score>75).

As can be appreciated from this example, ads may be eligible for one or more enhanced features. However, more than one eligible ad may compete for a fixed number (e.g., one, by a restriction in the document or by (e.g., an ad server) policy) of available enhanced features. In this case, a score (or a remaining score) may be used to determine which of a number of eligible ads will actually have a particular enhanced feature applied.

§4.4 Conclusions

As can be appreciated from the foregoing disclosure, present invention can be used to selectively apply enhanced features to one or more ads. If desired ad or advertiser characteristics are used in the determination of whether or not to apply certain enhanced features to the ad, advertisers will be motivated to provide or obtain such desired characteristics. Determining whether or not to apply enhanced ad features in this way should lead to better ads and markets than simply having advertisers pay a fixed surcharge for various formatting options (which provides advertisers with little or no incentive to improve the content of their ads or their Website).

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

What is claimed is:

1. A computer-implemented method comprising:
   selecting, by at least one processor and based on an outcome of an auction, a presentation order for a plurality of advertisements that have been selected to be presented with a document, the presentation order of the advertisements representing relative presentation positions of the advertisements with a document;
   receiving, by at least one processor, enhanced feature preference information associated with a particular advertisement in the plurality of advertisements, the enhanced feature preference information specifying approved enhanced features that have been approved, by an advertiser, to be applied to the particular advertisement;
   receiving, by at least one processor, an enhanced feature eligibility score for the particular advertisement, the enhanced feature eligibility score having been computed based on performance information corresponding to the particular advertisement;
   determining, by at least one processor, that an approved enhanced advertisement feature for the particular advertisement has a threshold that is satisfied by the enhanced feature eligibility score;

in response to determining that the threshold is satisfied by the enhanced feature eligibility score:
applying, to the particular advertisement and by at least one processor, the approved enhanced advertisement feature corresponding to the threshold; and
providing, by at least one processor and for presentation according to the presentation order, the particular advertisement to which the approved enhanced advertisement feature is applied.

2. The method of claim 1 wherein applying the approved enhanced advertisement feature to the particular advertisement comprises:
receiving document information corresponding to the document with which the particular advertisement will be presented, the document information including document restrictions that specify enhanced advertisement features that are excluded from presentation with the document; and
applying, based on the document information, the approved enhanced advertisement feature to the particular advertisement in response to a determination that the approved enhanced advertisement feature is eligible for presentation with the document based on the document information.

3. The method of claim 1 wherein the approved enhanced advertisement feature includes at least one of (A) increasing a size of the particular advertisement, (B) increasing a font size of text in the particular advertisement, (C) changing a font type of text in the particular advertisement, (D) increasing an amount of text shown in the particular advertisement, (E) providing enhanced color schemes to the particular advertisement, (F) providing the particular advertisement with animation, (G) providing the particular advertisement with video, (H) providing the particular advertisement with sound, (I) providing the particular advertisement with sound effects, (J) providing the particular advertisement with persistence, (K) providing the particular advertisement with a border, (L) providing the particular advertisement with an enhanced border, (M) providing the particular advertisement or in a desired shape, and (N) providing the particular advertisement with programmed interactivity.

4. The method of claim 1 wherein the performance information includes at least one of (A) a click-through rate of the particular advertisement, (B) user ratings of the particular advertisement, (C) focus group ratings of the particular advertisement, (D) a measure of user interest for the particular advertisement weighted for a size of the first advertisement relative to that of other advertisements, (E) a measure of user interest for the particular advertisement weighted for past positions of the particular advertisement relative to those past positions of other advertisements, (F) a measure of user interest for the particular advertisement weighted for enhanced features applied to the particular advertisement in the past, (G) expected user interest in the particular advertisement, (H) a time needed to render the particular advertisement relative to that needed to render other advertisements, (I) a measure of user interest for the particular advertisement weighted for a media type of the particular advertisement, (J) a conversion rate associated with the particular advertisement.

5. The method of claim 2, further comprising determining that the approved enhanced advertisement feature is not a restricted enhanced feature based on the document restrictions.

6. A computer-implemented method comprising:
selecting, by at least one processor and based on the outcome of an auction, a presentation order for a plurality of advertisements that have been selected to be presented with a document, the presentation order of the advertisements representing relative presentation positions of the advertisements with a document;
receiving, by at least one processor and from a first advertiser, first information associated with a first advertisement from the plurality of advertisements, the first information including:
first price information associated with the first advertisement,
first performance information associated with the first advertisement,
first advertiser information associated with the first advertisement; and
first enhanced feature preference information specifying approved enhanced features that have been approved, by the first advertiser, to be applied to the first advertisement;
receiving, by at least one processor and from a second advertiser, second information associated with a second advertisement from the plurality of advertisements, the second information including:
second price information associated with the second advertisement,
second performance information associated with the second advertisement,
second advertiser information associated with the second advertisement; and
second enhanced feature preference information specifying approved enhanced features that have been approved, by the second advertiser, to be applied to the second advertisement, the second advertiser being different from the first advertiser;
determining, by at least one processor, a first enhanced feature eligibility score, the first enhanced eligibility score being based on the first information;
determining, by at least one processor, a second enhanced feature eligibility score, the second enhanced eligibility score being based on the second information;
identifying, by at least one processor, an enhanced advertisement feature having a first threshold that is satisfied by the first enhanced feature eligibility score;
determining, by at least one processor, whether the second enhanced feature eligibility score exceeds the first enhanced feature eligibility score;
in response to determining that the second enhanced feature eligibility score exceeds the first enhanced feature eligibility score:
applying, by at least one processor, the enhanced advertisement feature to the second advertisement; and
in response to applying the enhanced advertisement feature to the second advertisement, adjusting the second enhanced feature eligibility score;
in response to determining that the second enhanced feature eligibility score does not exceed the first enhanced feature eligibility score:
applying the enhanced advertisement feature to the first advertisement; and
in response to applying the enhanced advertisement feature to the first advertisement, adjusting the first enhanced feature eligibility score; and
providing an enhanced advertisement to a user device, the enhanced advertisement being one of the first advertisement or the second advertisement to which the enhanced advertisement feature is applied, the enhanced advertisement being provided for presentation according to the selected presentation order.

7. The method of claim 6 wherein applying the enhanced advertisement feature to the first advertisement comprises:
  receiving document information corresponding to the document with which the first advertisement will be presented, the document information including document restrictions that specify enhanced advertisement features that are excluded from presentation with the document; and
  applying, based on the document information, the enhanced advertisement feature to the first advertisement in response to a determination that the enhanced advertisement feature is eligible for presentation with the document based on the document information.

8. The method of claim 6 wherein applying the enhanced advertisement feature to the second advertisement comprises:
  receiving document information corresponding to the document with which the second advertisement will be presented, the document information including document restrictions that specify enhanced advertisement features that are excluded from presentation with the document; and
  applying, based on the document information, the enhanced advertisement feature to the second advertisement in response to determining that the enhanced advertisement feature is eligible for presentation with the document based on a determination that the enhanced advertisement feature is eligible for presentation with the document based on the document information.

9. The method of claim 6 wherein the enhanced advertisement feature includes at least one of (A) increasing a size of the first advertisement or the second advertisement, (B) increasing a font size of text in the first advertisement or the second advertisement, (C) changing a font type of text in the first advertisement or the second advertisement, (D) increasing an amount of text shown in the first advertisement or the second advertisement, (E) providing enhanced color schemes to the first advertisement or the second advertisement, (F) providing the first advertisement or the second advertisement with animation, (G) providing the first advertisement or the second advertisement with video, (H) providing the first advertisement or the second advertisement with sound, (I) providing the first advertisement or the second advertisement with sound effects, (J) providing the first advertisement or the second advertisement with persistence, (K) providing the first advertisement or the second advertisement with a border, (L) providing the first advertisement or the second advertisement with an enhanced border, (M) providing the first advertisement or the second advertisement in a desired shape, and (N) providing the first advertisement or the second advertisement with programmed interactivity.

10. The method of claim 6 wherein the first price information includes at least one of (A) an amount that an advertiser has agreed to pay each time the first advertisement is rendered, (B) a maximum amount that the advertiser is willing to pay each time the first advertisement is rendered, (C) an amount that the advertiser has agreed to pay each time the first advertisement is rendered and selected, (D) a maximum amount that the advertiser is willing to pay each time the first advertisement is rendered and selected, (E) an average over time of the amount that the advertiser has agreed to pay each time the first advertisement is rendered and selected, (F) an average over time of the maximum amount that the advertiser is willing to pay each time the first advertisement is rendered and selected, (G) an amount that the advertiser has agreed to pay each time the first advertisement is rendered and a conversion associated with the first advertisement occurs, (H) a maximum amount that the advertiser is willing to pay each time the first advertisement is rendered and a conversion associated with the first advertisement occurs, (I) cost per selection information, (J) cost per conversion information, (K) an average of cost per selection information over a period of time, (L) an average cost per conversion information over time.

11. The method of claim 6 wherein the second price information includes at least one of (A) an amount that an advertiser has agreed to pay each time the second advertisement is rendered, (B) a maximum amount that the advertiser is willing to pay each time the second advertisement is rendered, (C) an amount that the advertiser has agreed to pay each time the second advertisement is rendered and selected, (D) a maximum amount that the advertiser is willing to pay each time the second advertisement is rendered and selected, (E) an average over time of the amount that the advertiser has agreed to pay each time the second advertisement is rendered and selected, (F) an average over time of the maximum amount that the advertiser is willing to pay each time the second advertisement is rendered and selected, (G) an amount that the advertiser has agreed to pay each time the second advertisement is rendered and a conversion associated with the second advertisement occurs, (H) a maximum amount that the advertiser is willing to pay each time the second advertisement is rendered and a conversion associated with the second advertisement occurs, (I) cost per selection information, (J) cost per conversion information, (K) an average of cost per selection information over a period of time, (L) an average cost per conversion information over time.

12. The method of claim 6 wherein the first performance information includes at least one of (A) a click-through rate of the first advertisement, (B) user ratings of the first advertisement, (C) focus group ratings of the first advertisement, (D) a measure of user interest for the first advertisement weighted for a size of the first advertisement relative to that of other advertisements, (E) a measure of user interest for the first advertisement weighted for past positions of the first advertisement relative to those past positions of other advertisements, (F) a measure of user interest for the first advertisement weighted for enhanced features applied to the first advertisement in the past, (G) expected user interest in the first advertisement, (H) a time needed to render the first advertisement relative to that needed to render other advertisements, (I) a measure of user interest for the first advertisement weighted for a media type of the first advertisement, (J) a conversion rate associated with the first advertisement.

13. The method of claim 6 wherein the second performance information includes at least one of (A) a click-through rate of the second advertisement, (B) user ratings of the second advertisement, (C) focus group ratings of the second advertisement, (D) a measure of user interest for the second advertisement weighted for a size of the second advertisement relative to that of other advertisements, (E) a measure of user interest for the second advertisement weighted for past positions of the second advertisement relative to those past positions of other advertisements, (F) a measure of user interest for the second advertisement weighted for enhanced features applied to the second advertisement in the past, (G) expected user interest in the second advertisement, (H) a time needed to render the second advertisement relative to that needed to render other advertisements, (I) a measure of user interest for the second advertisement weighted for a media type of the second advertisement, (J) a conversion rate associated with the second advertisement.

14. The method of claim 6 wherein the first advertiser information and the second advertiser information each include at least one of (A) charge-back information, (B) a quality metric of an advertiser's Web page, (C) conversion information, (D) customer ratings of the advertiser, (E) third party ratings of the advertiser; (F) complaints logged against the advertiser; (G) information about repeat visits to the advertiser; (H) information about repeat purchases from the advertiser; (I) abnormally high price information; and (J) abnormally high advertising budget.

15. The method of claim 6, further comprising:
determining whether the second enhanced feature eligibility score satisfies the first threshold; and
in response to determining that the second enhanced feature eligibility score does not satisfy the first threshold, applying the enhanced advertisement feature to the first advertisement.

16. The method of claim 8, wherein identifying the enhanced advertisement feature having the first threshold that is satisfied by the first enhanced feature eligibility score comprises determining that the enhanced advertisement feature is not a restricted enhanced feature based on the document restrictions included in the document information.

17. An apparatus comprising:
at least one processor configured to select, based on an outcome of an auction, a presentation order for a plurality of advertisements that have been selected to be presented with a document, the presentation order of the advertisements representing relative presentation positions of the advertisements with a document;
a first input means for receiving enhanced feature preference information associated with a particular advertisement from the plurality of advertisements, the enhanced feature preference information specifying approved enhanced features that have been approved, by an advertiser, to be applied to the particular advertisement;
means for receiving an enhanced feature eligibility score for the particular advertisement, the enhanced feature eligibility score having been computed based on performance information corresponding to the particular advertisement;
means for determining that an approved enhanced advertisement feature for the particular advertisement has a threshold that is satisfied by the enhanced feature eligibility score for the particular advertisement;
means for applying the approved enhanced feature corresponding to the threshold to the particular advertisement in response to determining that the enhanced feature eligibility score corresponding to the particular advertisement exceeds the threshold; and
means for providing an enhanced advertisement to a user device, the enhanced advertisement being the particular advertisement to which the approved enhanced advertisement feature is applied, the enhanced advertisement being provided according to the selected presentation order.

18. The apparatus of claim 17 wherein the means for applying the approved enhanced advertisement feature to the particular advertisement comprises:
means for receiving document information corresponding to the document with which the particular advertisement will be presented, the document information including document restrictions that specify enhanced advertisement features that are excluded from presentation with the document; and
means for applying, based on the document information, the approved enhanced advertisement feature to the particular advertisement in response to a determination that the approved enhanced advertisement feature is eligible for presentation with the document based on the document information.

19. The apparatus of claim 17 wherein the approved enhanced advertisement feature includes at least one of (A) increasing a size of the particular advertisement, (B) increasing a font size of text in the particular advertisement, (C) changing a font type of text in the particular advertisement, (D) increasing an amount of text shown in the particular advertisement, (E) providing enhanced color schemes to the particular advertisement, (F) providing the particular advertisement with animation, (G) providing the particular advertisement with video, (H) providing the particular advertisement with sound, (I) providing the particular advertisement with sound effects, (J) providing the particular advertisement with persistence, (K) providing the particular advertisement with a border, (L) providing the particular advertisement with an enhanced border, (M) providing the particular advertisement in a desired shape, and (N) providing the particular advertisement with programmed interactivity.

20. The apparatus of claim 17 wherein the performance information includes at least one of (A) a click-through rate of the particular advertisement, (B) user ratings of the particular advertisement, (C) focus group ratings of the particular advertisement, (D) a measure of user interest for the particular advertisement weighted for a size of the particular advertisement relative to that of other advertisements, (E) a measure of user interest for the particular advertisement weighted for past positions of the particular advertisement relative to those past positions of other advertisements, (F) a measure of user interest for the particular advertisement weighted for enhanced features applied to the particular advertisement in the past, (G) expected user interest in the particular advertisement, (H) a time needed to render the particular advertisement relative to that needed to render other advertisements, (I) a measure of user interest for the particular advertisement weighted for a media type of the particular advertisement, (J) a conversion rate associated with the particular advertisement.

21. The apparatus of claim 18, wherein the means for determining that an approved enhanced advertisement feature for the particular advertisement has a threshold that is satisfied by the enhanced feature eligibility score for the particular advertisement comprises means for determining that the approved enhanced advertisement feature is not a restricted enhanced feature based on the document restrictions.

22. An apparatus comprising:
at least one processor configured to select, based on an outcome of an auction, a presentation order for a plurality of advertisements that have been selected to be presented with a document, the presentation order of the advertisements representing relative presentation positions of the advertisements with a document;
a first input means for receiving, from a first advertiser, first information associated with a first advertisement in the plurality of advertisements, the first information including:
first price information associated with the first advertisement,
first performance information associated with the first advertisement,
first advertiser information associated with the first advertisement, and first enhanced feature preference information specifying approved enhanced features that have been approved, by the first advertiser, to be applied to the first advertisement;

a second input means for receiving, from a second advertiser, second information associated with a second advertisement in the plurality of advertisements, the second information including:
    second price information associated with the second advertisement,
    second performance information associated with the second advertisement,
    second advertiser information associated with the second advertisement, and
    second enhanced feature preference information specifying approved enhanced features that have been approved, by the second advertiser, to be applied to the second advertisement, the second advertiser being different from the first advertiser;

means for determining a first enhanced feature eligibility score, the first enhanced eligibility score based on the first information;

means for determining a second enhanced feature eligibility score, the second enhanced eligibility score based on the second information;

means for identifying an enhanced advertisement feature having a first threshold that is satisfied by the first enhanced feature eligibility score;

means for determining whether the second enhanced feature eligibility score exceeds the first enhanced eligibility score;

means for applying the enhanced advertisement feature to the second advertisement in response to determining that the second enhanced feature eligibility score exceeds the first enhanced eligibility score;

means for reducing the second enhanced feature eligibility score in response to applying the enhanced advertisement feature to the second advertisement;

means for applying the enhanced advertisement feature to the first advertisement in response to determining that the second enhanced feature eligibility score does not exceed the first enhanced feature eligibility score;

means for reducing the first enhanced feature eligibility score in response to applying the enhanced advertisement feature to the first advertisement; and means for providing an enhanced advertisement to a user device, the enhanced advertisement being one of the first advertisement or the second advertisement to which the enhanced advertisement feature is applied, the enhanced advertisement being provided for presentation according to the selected presentation order.

23. The apparatus of claim 22 wherein the means for applying the enhanced advertisement feature to the first advertisement comprises:
    means for receiving document information corresponding to the document with which the first advertisement will be presented, the document information including document restrictions that specify enhanced advertisement features that are excluded from presentation with the document; and
    means for applying, based on the document information, the enhanced advertisement feature to the first advertisement in response to a determination that the enhanced advertisement feature is eligible for presentation with the document based on the document information.

24. The apparatus of claim 22 wherein the means for applying the enhanced advertisement feature to the second advertisement comprises:
    means for receiving document information corresponding to the document with which the second advertisement will be presented, the document information including document restrictions that specify enhanced advertisement features that are excluded from presentation with the document; and
    means for applying, based on the document information, the enhanced advertisement feature to the first advertisement in response to determining that the enhanced advertisement feature is eligible for presentation with the document based on a determination that the enhanced advertisement feature is eligible for presentation with the document based on the document information.

25. The apparatus of claim 22 wherein the enhanced advertisement feature includes at least one of (A) increasing a size of the first advertisement or the second advertisement, (B) increasing a font size of text in the first advertisement or the second advertisement, (C) changing a font type of text in the first advertisement or the second advertisement, (D) increasing an amount of text shown in the first advertisement or the second advertisement, (E) providing enhanced color schemes to the first advertisement or the second advertisement, (F) providing the first advertisement or the second advertisement with animation, (G) providing the first advertisement or the second advertisement with video, (H) providing the first advertisement or the second advertisement with sound, (I) providing the first advertisement or the second advertisement with sound effects, (J) providing the first advertisement or the second advertisement with persistence, (K) providing the first advertisement or the second advertisement with a border, (L) providing the first advertisement or the second advertisement with an enhanced border, (M) providing the first advertisement or the second advertisement in a desired shape, and (N) providing the first advertisement or the second advertisement with programmed interactivity.

26. The apparatus of claim 22 wherein the first price information includes at least one of (A) an amount that an advertiser has agreed to pay each time the first advertisement is rendered, (B) a maximum amount that the advertiser is willing to pay each time the first advertisement is rendered, (C) an amount that the advertiser has agreed to pay each time the first advertisement is rendered and selected, (D) a maximum amount that the advertiser is willing to pay each time the first advertisement is rendered and selected, (E) an average over time of the amount that the advertiser has agreed to pay each time the first advertisement is rendered and selected, (F) an average over time of the maximum amount that the advertiser is willing to pay each time the first advertisement is rendered and selected, (G) an amount that the advertiser has agreed to pay each time the first advertisement is rendered and a conversion associated with the first advertisement occurs, (H) a maximum amount that the advertiser is willing to pay each time the first advertisement is rendered and a conversion associated with the first advertisement occurs, (I) cost per selection information, (J) cost per conversion information, (K) an average of cost per selection information over a period of time, (L) an average cost per conversion information over time.

27. The apparatus of claim 22 wherein the second price information includes at least one of (A) an amount that an advertiser has agreed to pay each time the second advertisement is rendered, (B) a maximum amount that the advertiser is willing to pay each time the second advertisement is rendered, (C) an amount that the advertiser has agreed to pay each time the second advertisement is rendered and selected, (D) a maximum amount that the advertiser is willing to pay each time the second advertisement is rendered and selected, (E) an average over time of the amount that the advertiser has agreed to pay each time the second advertisement is rendered and selected, (F) an average over time of the maximum amount that the advertiser is willing to pay each time the second advertisement is rendered and selected, (G) an amount that the advertiser has agreed to pay each time the second advertisement is rendered and a conversion associated with the second advertisement occurs, (H) a maximum amount that the advertiser is willing to pay each time the second advertisement is rendered and a conversion associated with the second advertisement occurs, (I) cost per selection information, (J) cost per conversion information, (K) an average of cost per selection information over a period of time, (L) an average cost per conversion information over time.

28. The apparatus of claim 22 wherein the first performance information includes at least one of (A) a click-through rate of the first advertisement, (B) user ratings of the first advertisement, (C) focus group ratings of the first advertisement, (D) a measure of user interest for the first advertisement weighted for a size of the first advertisement relative to that of other advertisements, (E) a measure of user interest for the first advertisement weighted for past positions of the first advertisement relative to those past positions of other advertisements, (F) a measure of user interest for the first advertisement weighted for enhanced features applied to the first advertisement in the past, (G) expected user interest in the first advertisement, (H) a time needed to render the first advertisement relative to that needed to render other advertisements, (I) a measure of user interest for the first advertisement weighted for a media type of the first advertisement, (J) a conversion rate associated with the first advertisement.

29. The apparatus of claim 22 wherein the second performance information includes at least one of (A) a click-through rate of the second advertisement, (B) user ratings of the second advertisement, (C) focus group ratings of the second advertisement, (D) a measure of user interest for the second advertisement weighted for a size of the second advertisement relative to that of other advertisements, (E) a measure of user interest for the second advertisement weighted for past positions of the second advertisement relative to those past positions of other advertisements, (F) a measure of user interest for the second advertisement weighted for enhanced features applied to the second advertisement in the past, (G) expected user interest in the second advertisement, (H) a time needed to render the second advertisement relative to that needed to render other advertisements, (I) a measure of user interest for the second advertisement weighted for a media type of the second advertisement, (J) a conversion rate associated with the second advertisement.

30. The apparatus of claim 22 wherein the first advertiser information and the second advertiser information each include at least one of (A) charge-back information, (B) a quality metric of an advertiser's Web page, (C) conversion information, (D) customer ratings of the advertiser, (E) third party ratings of the advertiser; (F) complaints logged against the advertiser; (G) information about repeat visits to the advertiser; (H) information about repeat purchases from the advertiser; (I) abnormally high price information; and (J) abnormally high advertising budget.

31. The apparatus of claim 22, further comprising:
means for determining whether the second enhanced feature eligibility score satisfies the first threshold; and
in response to determining that the second enhanced feature eligibility score does not satisfy the first threshold, means for applying the enhanced advertisement feature to the first advertisement.

32. The apparatus of claim 22, wherein the means for identifying the enhanced advertisement feature having the first threshold that is satisfied by the first enhanced feature eligibility score comprises means for determining that the approved enhanced advertisement feature is not a restricted enhanced feature based on the document restrictions.

33. A system comprising one or more processors connected to one or more storage devices and one or more input/output devices, wherein:
at least one processor is configured to select, based on an outcome of an auction, a presentation order for a plurality of advertisements that have been selected to be presented with a document, the presentation order of the advertisements representing relative presentation positions of the advertisements of a document;
an input device is configured to receive enhanced feature preference information associated with a particular advertisement in the plurality of advertisements, the enhanced feature preference information specifying approved enhanced features that have been approved to be applied to the particular advertisement by an advertiser;
at least one processor is configured to obtain an enhanced feature eligibility score for the particular advertisement, the enhanced eligibility score having been computed based on performance information corresponding to the particular advertisement;
at least one processor is configured to determine that an approved enhanced advertisement feature for the particular advertisement has a threshold that is satisfied by the enhanced feature eligibility score;
at least one processor is configured to apply the approved enhanced advertisement feature to the particular advertisement in response to a determination that the threshold is satisfied by the enhanced feature eligibility score; and
at least one processor is configured to provide an enhanced advertisement to a user device, the enhanced advertisement being the particular advertisement to which the approved enhanced advertisement feature is applied, the enhanced advertisement being provided according to the selected presentation order.

34. The system of claim 33, wherein the at least one processor that is configured to apply the approved enhanced advertisement feature to the particular advertisement is further configured to:
receive document information corresponding to the document with which the particular advertisement will be presented, the document information including document restrictions that specify enhanced advertisement features that are excluded from presentation with the document; and
apply, based on the document information, the approved enhanced advertisement feature to the particular advertisement in response to a determination that the approved enhanced advertisement feature is eligible for presentation with the document based on the document information.

35. The system of claim 33, wherein the approved enhanced advertisement feature includes at least one of (A) increasing a size of the particular advertisement, (B) increasing a font size of text in the particular advertisement, (C) changing a font type of text in the particular advertisement, (D) increasing an amount of text shown in the particular advertisement, (E) providing enhanced color schemes to the particular advertisement, (F) providing the particular advertisement with animation, (G) providing the particular advertisement with video, (H) providing the particular advertisement with sound, (I) providing the particular advertisement with sound effects, (J) providing the particular advertisement with persistence, (K) providing the particular advertisement with a border, (L) providing the particular advertisement with an enhanced border, (M) providing the first advertisement or the second advertisement at a desired location on the document, (N) providing the particular advertisement in a desired shape, and (O) providing the particular advertisement with programmed interactivity.

36. The system of claim 33, wherein the enhanced feature eligibility score has been computed based on price information corresponding to the particular advertisement, wherein the price information includes at least one of (A) an amount that the advertiser has agreed to pay each time the particular advertisement is rendered, (B) a maximum amount that the advertiser is willing to pay each time the particular advertisement is rendered, (C) an amount that the advertiser has agreed to pay each time the particular advertisement is rendered and selected, (D) a maximum amount that the advertiser is willing to pay each time the particular advertisement is rendered and selected, (E) an average over time of the amount that the advertiser has agreed to pay each time the particular advertisement is rendered and selected, (F) an average over time of the maximum amount that the advertiser is willing to pay each time the particular advertisement is rendered and selected, (G) an amount that the advertiser has agreed to pay each time the particular advertisement is rendered and a conversion associated with the particular advertisement occurs, (H) a maximum amount that the advertiser is willing to pay each time the particular advertisement is rendered and a conversion associated with the particular advertisement occurs, (I) cost per selection information, (J) cost per conversion information, (K) an average of cost per selection information over a period of time, (L) an average cost per conversion information over time.

37. The system of claim 33, wherein the performance information includes at least one of (A) a click-through rate of the particular advertisement, (B) user ratings of the particular advertisement, (C) focus group ratings of the particular advertisement, (D) a measure of user interest for the particular advertisement weighted for a size of the particular advertisement relative to that of other advertisements, (E) a measure of user interest for the particular advertisement weighted for past positions of the particular advertisement relative to those past positions of other advertisements, (F) a measure of user interest for the particular advertisement weighted for enhanced features applied to the particular advertisement in the past, (G) expected user interest in the particular advertisement, (H) a time needed to render the particular advertisement relative to that needed to render other advertisements, (I) a measure of user interest for the particular advertisement weighted for a media type of the particular advertisement, (J) a conversion rate associated with the particular advertisement.

38. The system of claim 33, wherein the enhanced feature eligibility score has been computed based on advertiser information that includes at least one of (A) charge-back information, (B) a quality metric of an advertiser's Web page, (C) conversion information, (D) customer ratings of the advertiser, (E) third party ratings of the advertiser; (F) complaints logged against the advertiser; (G) information about repeat visits to the advertiser; (H) information about repeat purchases from the advertiser; (I) abnormally high price information; and (J) abnormally high advertising budget.

39. A system comprising one or more processors connected to one or more storage devices and one or more input/output devices, wherein:
  at least one processor is configured to select, based on an outcome of an auction, a presentation order for a plurality of advertisements that have been selected to be presented with a document, the presentation order of the advertisements representing relative presentation positions of the advertisements of a document;
  a first input device is configured to receive first information associated with a first advertisement in the plurality of advertisements, the first information including:
    first price information associated with the first advertisement,
    first performance information associated with the first advertisement,
    first advertiser information associated with the first advertisement, and
    first enhanced feature preference information specifying approved enhanced features that have been approved, by the first advertiser, to be applied to the first advertisement;
  a second input device is configured to receive second information associated with a second advertisement in the plurality of advertisements, the second information including:
    second price information associated with the second advertisement,
    second performance information associated with the second advertisement,
    second advertiser information associated with the second advertisement and
    second enhanced feature preference information specifying approved enhanced features that have been approved, by the second advertiser, to be applied to the second advertisement, the second advertiser being different from the first advertiser;
  one or more processors are configured to:
    determine a first enhanced feature eligibility score, the first enhanced eligibility score based on the first information;
    determine a second enhanced feature eligibility score, the second enhanced eligibility score based on the second information;
    identify an enhanced advertisement feature having a first threshold that is satisfied by the first enhanced feature eligibility score;
    determine whether the second enhanced feature eligibility score exceeds the first enhanced eligibility score;
    in response to determination that the second enhanced feature eligibility score exceeds the first enhanced eligibility score:
      apply the enhanced advertisement feature to the second advertisement; and
      in response to application of the enhanced advertisement feature to the second advertisement, reduce the second enhanced feature eligibility score by a value corresponding to the enhanced advertisement feature; in response to determination that the second enhanced feature eligibility score does not exceed the first enhanced feature eligibility score:
      apply the enhanced advertisement feature to the first advertisement; and
      in response to application of the enhanced advertisement feature to the first advertisement, reduce the first enhanced feature eligibility score by a value corresponding to the enhanced advertisement feature; and provide an enhanced advertisement to a user device, the enhanced advertisement being one of the first advertisement or the second advertisement to which the enhanced advertisement feature is applied, the enhanced advertisement being provided for presentation according to the selected presentation order.

40. The system of claim 39, wherein the one or more processors that are configured to apply the enhanced advertisement feature to the first advertisement are further configured to:

receive document information corresponding to the document with which the first advertisement will be presented, the document information including document restrictions that specify enhanced advertisement features that are excluded from presentation with the document; and apply, based on the document information, the enhanced advertisement feature to the first advertisement in response to a determination that the enhanced advertisement feature is eligible for presentation with the document based on the document information.

41. The system of claim 39, wherein the one or more processors that are configured to apply the enhanced advertisement feature to the second advertisement are further configured to:

receive document information corresponding to the document with which the second advertisement will be presented, the document information including document restrictions that specify enhanced advertisement features that are excluded from presentation with the document; and apply, based on the document information, the enhanced advertisement feature to the first advertisement in response to determining that the enhanced advertisement feature is eligible for presentation with the document based on a determination that the enhanced advertisement feature is eligible for presentation with the document based on the document information.

42. The system of claim 39, wherein the enhanced advertisement feature includes at least one of (A) increasing a size of the first advertisement or the second advertisement, (B) increasing a font size of text in the first advertisement or the second advertisement, (C) changing a font type of text in the first advertisement or the second advertisement, (D) increasing an amount of text shown in the first advertisement or the second advertisement, (E) providing enhanced color schemes to the first advertisement or the second advertisement, (F) providing the first advertisement or the second advertisement with animation, (G) providing the first advertisement or the second advertisement with video, (H) providing the first advertisement or the second advertisement with sound, (I) providing the first advertisement or the second advertisement with sound effects, (J) providing the first advertisement or the second advertisement with persistence, (K) providing the first advertisement or the second advertisement with a border, (L) providing the first advertisement or the second advertisement with an enhanced border, (M) providing the first advertisement or the second advertisement in a desired shape, and (N) providing the first advertisement or the second advertisement with programmed interactivity.

43. The system of claim 39, wherein the first price information includes at least one of (A) an amount that an advertiser has agreed to pay each time the first advertisement is rendered, (B) a maximum amount that the advertiser is willing to pay each time the first advertisement is rendered, (C) an amount that the advertiser has agreed to pay each time the first advertisement is rendered and selected, (D) a maximum amount that the advertiser is willing to pay each time the first advertisement is rendered and selected, (E) an average over time of the amount that the advertiser has agreed to pay each time the first advertisement is rendered and selected, (F) an average over time of the maximum amount that the advertiser is willing to pay each time the first advertisement is rendered and selected, (G) an amount that the advertiser has agreed to pay each time the first advertisement is rendered and a conversion associated with the first advertisement occurs, (H) a maximum amount that the advertiser is willing to pay each time the first advertisement is rendered and a conversion associated with the first advertisement occurs, (I) cost per selection information, (J) cost per conversion information, (K) an average of cost per selection information over a period of time, (L) an average cost per conversion information over time.

44. The system of claim 39, wherein the second price information includes at least one of (A) an amount that an advertiser has agreed to pay each time the second advertisement is rendered, (B) a maximum amount that the advertiser is willing to pay each time the second advertisement is rendered, (C) an amount that the advertiser has agreed to pay each time the second advertisement is rendered and selected, (D) a maximum amount that the advertiser is willing to pay each time the second advertisement is rendered and selected, (E) an average over time of the amount that the advertiser has agreed to pay each time the second advertisement is rendered and selected, (F) an average over time of the maximum amount that the advertiser is willing to pay each time the second advertisement is rendered and selected, (G) an amount that the advertiser has agreed to pay each time the second advertisement is rendered and a conversion associated with the second advertisement occurs, (H) a maximum amount that the advertiser is willing to pay each time the second advertisement is rendered and a conversion associated with the second advertisement occurs, (I) cost per selection information, (J) cost per conversion information, (K) an average of cost per selection information over a period of time, (L) an average cost per conversion information over time.

45. The system of claim 39, wherein the first performance information includes at least one of (A) a click-through rate of the first advertisement, (B) user ratings of the first advertisement, (C) focus group ratings of the first advertisement, (D) a measure of user interest for the first advertisement weighted for a size of the first advertisement relative to that of other advertisements, (E) a measure of user interest for the first advertisement weighted for past positions of the first advertisement relative to those past positions of other advertisements, (F) a measure of user interest for the first advertisement weighted for enhanced features applied to the first advertisement in the past, (G) expected user interest in the first advertisement, (H) a time needed to render the first advertisement relative to that needed to render other advertisements, (I) a measure of user interest for the first advertisement weighted for a media type of the first advertisement, (J) a conversion rate associated with the first advertisement.

46. The system of claim 39, wherein the second performance information includes at least one of (A) a click-through rate of the second advertisement, (B) user ratings of the second advertisement, (C) focus group ratings of the second advertisement, (D) a measure of user interest for the second advertisement weighted for a size of the second advertisement relative to that of other advertisements, (E) a measure of user interest for the second advertisement weighted for past positions of the second advertisement relative to those past positions of other advertisements, (F) a measure of user interest for the second advertisement weighted for enhanced features applied to the second advertisement in the past, (G) expected user interest in the second advertisement, (H) a time needed to render the second advertisement relative to that needed to render other advertisements, (I) a measure of user interest for the second advertisement weighted for a media type of the second advertisement, (J) a conversion rate associated with the second advertisement.

47. The system of claim 39, wherein the first advertiser information and the second advertiser information each include at least one of (A) charge-back information, (B) a quality metric of an advertiser's Web page, (C) conversion information, (D) customer ratings of the advertiser, (E) third party ratings of the advertiser; (F) complaints logged against the advertiser; (G) information about repeat visits to the advertiser; (H) information about repeat purchases from the advertiser; (I) abnormally high price information; and (J) abnormally high advertising budget.

48. The system of claim 39, wherein the one or more processors are further configured to:
determine whether the second enhanced feature eligibility score satisfies the first threshold; and
in response to determination that the second enhanced feature eligibility score does not satisfy the first threshold, apply the enhanced advertisement feature to the first advertisement.

49. The system of claim 39, wherein:
the first input device is further configured to receive the first information associated with the first advertisement from a first advertiser; and
the second input device is further configured to receive the second information associated with the second advertisement from a second advertiser, the second advertiser being different from the first advertiser.

50. A computer-implemented method, comprising:
selecting, by at least one processor and based on an outcome of an auction, a presentation order for a plurality of advertisements that have been selected to be presented in a plurality of advertisement positions corresponding to a document;
receiving, by at least one processor, a first feature eligibility score and first enhanced feature preference information for a first advertisement that is provided by a first advertiser, the first feature eligibility score being based on first price information and first performance information corresponding to the first advertisement, the first enhanced feature preference information specifying approved enhanced features that have been approved, by the first advertiser, to be applied to the first advertisement, the first advertisement being an advertisement in the plurality of advertisements;
receiving, by at least one processor, a second feature eligibility score and second enhanced feature preference information for a second advertisement that is provided by a second advertiser, the second feature eligibility score being based on second price information and second performance information corresponding to the second advertisement, the second enhanced feature preference information specifying approved enhanced features that have been approved, by the second advertiser, to be applied to the second advertisement, and the second advertiser being different from the first advertiser, the second advertisement being an advertisement in the plurality of advertisements;
identifying a first feature enhancement that is an approved enhanced feature for each of the first advertisement and the second advertisement, and for which the first advertisement and the second advertisement are both eligible, the identification being based on the first feature eligibility score and the second feature eligibility score both satisfying an eligibility score threshold for the first feature enhancement;
determining, by at least one processor, that the first feature eligibility score is higher than the second feature eligibility score;
in response to determining that the first feature eligibility score is higher than the second feature eligibility score:
applying, by at least one processor, the first feature enhancement to the first advertisement; and
reducing, by at least one processor, the first feature eligibility score to create a remaining feature eligibility score for the first advertisement, the first feature eligibility score being reduced by a value corresponding to the first feature enhancement that was applied to the first advertisement; and
selecting, by at least one processor, a second feature enhancement to apply to an advertisement selected from the first advertisement and the second advertisement, the advertisement to which the second feature enhancement will be applied being based on the remaining feature eligibility score and the second feature eligibility score.

51. The method of claim 50, further comprising determining that the first advertisement is eligible for application of the first feature enhancement based on exclusion parameters that specify feature enhancements for which the first advertisement is ineligible.

52. The method of claim 50, further comprising determining that the first feature enhancement is an eligible feature enhancement for advertisements presented with the document with which the first advertisement will be presented, the determination being based on enhanced feature restrictions for the document.

53. The method of claim 50, wherein the feature enhancement includes at least one of (A) increasing a size of the first advertisement or the second advertisement, (B) increasing a font size of text in the first advertisement or the second advertisement, (C) changing a font type of text in the first advertisement or the second advertisement, (D) increasing an amount of text shown in the first advertisement or the second advertisement, (E) providing enhanced color schemes to the first advertisement or the second advertisement.

54. The method of claim 50, wherein the feature enhancement includes at least one of (A) providing the first advertisement or the second advertisement with animation, (B) providing the first advertisement or the second advertisement with video, (C) providing the first advertisement or the second advertisement with sound, (D) providing the first advertisement or the second advertisement with sound effects, (E) providing the first advertisement or the second advertisement with persistence.

55. The method of claim 50, wherein the feature enhancement includes at least one of (A) providing the first advertisement or the second advertisement with a border, (B) providing the first advertisement or the second advertisement with an enhanced border, (C) providing the first advertisement or the second advertisement in a desired shape, and (D) providing the first advertisement or the second advertisement with programmed interactivity.

* * * * *

UNITED STATES PATENT AND TRADEMARK OFFICE
CERTIFICATE OF CORRECTION

PATENT NO. : 8,595,071 B2  Page 1 of 1
APPLICATION NO. : 10/610350
DATED : November 26, 2013
INVENTOR(S) : Eric Veach It is certified that error appears in the above-identified patent and that said Letters Patent is hereby corrected as shown below:

In the Claims

In Claim 3, Column 17, Line 39, after "advertisement" delete "or".

In Claim 19, Column 22, Line 14, delete "II" and insert -- (H), --, therefor.

In Claim 35, Column 27, Line 3-4, delete "advertisement," and insert -- advertisement --, therefor.

In Claim 39, Column 28, Line 34, delete "advertisement" and insert -- advertisement, --, therefor.

Signed and Sealed this
Eighth Day of April, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,595,071 B2 | Page 1 of 1 |
| APPLICATION NO. | : 10/610350 | |
| DATED | : November 26, 2013 | |
| INVENTOR(S) | : Veach | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1577 days.

Signed and Sealed this
Twenty-first Day of April, 2015

Michelle K. Lee
*Director of the United States Patent and Trademark Office*